(12) United States Patent
Job et al.

(10) Patent No.: US 9,251,505 B2
(45) Date of Patent: Feb. 2, 2016

(54) NETWORK CONTACT MANAGEMENT

(75) Inventors: Sujith Job, Pune (IN); Lokesh Mishra, Chhattisgarh (IN); Pradosh A. Tarkar, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 13/247,155

(22) Filed: Sep. 28, 2011

(65) Prior Publication Data

US 2013/0080912 A1    Mar. 28, 2013

(51) Int. Cl.
*G06F 17/20* (2006.01)
*G06Q 10/10* (2012.01)
*G06F 15/16* (2006.01)

(52) U.S. Cl.
CPC .............. *G06Q 10/103* (2013.01); *G06F 15/16* (2013.01)

(58) Field of Classification Search
CPC .. G06F 3/0481; H04L 29/08072; H04L 29/06
See application file for complete search history.

(56) References Cited

U.S. PATENT DOCUMENTS

| | | | |
|---|---|---|---|
| 5,289,321 A | 2/1994 | Secor | |
| 5,491,991 A | 2/1996 | Guillory | |
| 5,602,997 A | 2/1997 | Carpenter et al. | |
| 5,754,174 A | 5/1998 | Carpenter et al. | |
| 6,729,647 B2 | 5/2004 | Shapiro et al. | |
| 6,965,368 B1 | 11/2005 | Andrews et al. | |
| 7,636,895 B2 | 12/2009 | Gilboa | |
| 2003/0233650 A1* | 12/2003 | Zaner .................. | H04L 12/1822 725/32 |
| 2006/0150118 A1 | 7/2006 | Chaudhri et al. | |
| 2006/0229922 A1 | 10/2006 | Levy et al. | |
| 2007/0101279 A1 | 5/2007 | Chaudhri et al. | |
| 2007/0130541 A1 | 6/2007 | Louch et al. | |
| 2008/0034314 A1 | 2/2008 | Louch et al. | |
| 2009/0006591 A1 | 1/2009 | Whitsett et al. | |
| 2009/0320105 A1 | 12/2009 | Jurkiewicz et al. | |
| 2010/0023874 A1 | 1/2010 | Frohwein | |
| 2010/0185547 A1 | 7/2010 | Scholar | |
| 2010/0251124 A1* | 9/2010 | Geppert .............. | G06F 3/04817 715/734 |

OTHER PUBLICATIONS

Aviles-Lopez, et al., "UbiSOA Dshboard: Integrating the Physical and Digital Domains through Mashups", Computer Scient Department, CICESE Research Center, URL: http://usuario.cicese.mx/~d-jagm/docs/avilesgarcia-hcii09.pdf, 10 pages.

(Continued)

*Primary Examiner* — Stephen Hong
*Assistant Examiner* — Shahid Khan
(74) *Attorney, Agent, or Firm* — Schmeiser, Olsen & Watts; John Pivnichny

(57) ABSTRACT

A contact management method and system is provided. The method includes presenting, by a computer processor via a dashboard of a graphical user interface, a user name icon associated with a user. The computer processor presents a list of names associated with users and receives a selection for a first contact name. A file sharing option between the user and a user associated with the first contact name is enabled. The computer processor receives a selection for a second contact name and in response presents an internal network contacts map comprising the user name icon connected to the first contact name via a first link and the user name icon connected to the second contact name via a second link. The first link comprises an attribute indicating the file sharing option and the second link comprises an attribute indicating that the file sharing option is not enabled.

20 Claims, 8 Drawing Sheets

(56) References Cited

OTHER PUBLICATIONS

Definition and Best Practices of Mashups, LogiXML website, URL: http://www.logixml.com/bi-encyclopedia/mashups, 5 pages; retrieved from the Internet Apr. 5, 2011.

Next-Generation Applications Using Ajax and Open Ajax, Ajax Whitepaper, URL: http://www.openajax.org/whitepapers/Next-Generation%20Applications%20Ajax%20and%20OpenAjax.php, 5 pages, retrieved from the Internet Apr. 7, 2011.

Casarez, et al., "Reshaping Your Business with Web 2.0", McGraw-Hill, 2009, 260 pages (pp. 117-118).

* cited by examiner

NETWORK CONTACT MANAGEMENT

TECHNICAL FIELD

The present invention relates to a method and associated system for managing network contacts.

BACKGROUND

Managing networks typically comprises an inaccurate process with little flexibility. Network management within a system typically includes a manual process. Manually managing networks may be time consuming and require a large amount of resources. Accordingly, there exists a need in the art to overcome at least some of the deficiencies and limitations described herein above.

SUMMARY

The present invention provides a method comprising: presenting, by a computer processor of a computing apparatus via a dashboard of a graphical user interface, a user name icon associated with a first user; presenting, by the computer processor via a contacts panel of the graphical user interface, a list of names associated with users associated with the first user; receiving, by the computer processor from the first user, a first selection for a first contact name of the names; enabling, by the computer processor in response to an indication from the first user, a file sharing option between the first user and a user associated with the first contact name; receiving, by the computer processor from the first user, a second selection for a second contact name of the names; and presenting in response to the selection, by the computer processor via the dashboard, an internal network contacts map comprising the user name icon connected to the first contact name via a first link and the user name icon connected to the second contact name via a second link, wherein the first link comprises a first attribute indicating the file sharing option, wherein the second link comprises a second attribute indicating that the file sharing option is not enabled between the first user and a user associated with second contact name, and wherein the first attribute differs from the second attribute.

The present invention provides a computing system comprising a computer processor coupled to a computer-readable memory unit, the memory unit comprising instructions that when executed by the computer processor implements a method comprising: presenting, by the computer processor via a dashboard of a graphical user interface, a user name icon associated with a first user; presenting, by the computer processor via a contacts panel of the graphical user interface, a list of names associated with users associated with the first user; receiving, by the computer processor from the first user, a first selection for a first contact name of the names; enabling, by the computer processor in response to an indication from the first user, a file sharing option between the first user and a user associated with the first contact name; receiving, by the computer processor from the first user, a second selection for a second contact name of the names; and presenting in response to the selection, by the computer processor via the dashboard, an internal network contacts map comprising the user name icon connected to the first contact name via a first link and the user name icon connected to the second contact name via a second link, wherein the first link comprises a first attribute indicating the file sharing option, wherein the second link comprises a second attribute indicating that the file sharing option is not enabled between the first user and a user associated with second contact name, and wherein the first attribute differs from the second attribute.

The present invention provides a computer program product, comprising a computer readable storage medium having a computer readable program code embodied therein, said computer readable program code comprising an algorithm that when executed by a computer processor of a computing system implements a method comprising: presenting, by said computer processor via a dashboard of a graphical user interface, a user name icon associated with a first user; presenting, by said computer processor via a contacts panel of said graphical user interface, a list of names associated with users associated with said first user; receiving, by said computer processor from said first user, a first selection for a first contact name of said names; enabling, by said computer processor in response to an indication from said first user, a file sharing option between said first user and a user associated with said first contact name; receiving, by said computer processor from said first user, a second selection for a second contact name of said names; and presenting in response to said selection, by said computer processor via said dashboard, an internal network contacts map comprising said user name icon connected to said first contact name via a first link and said user name icon connected to said second contact name via a second link, wherein said first link comprises a first attribute indicating said file sharing option, wherein said second link comprises a second attribute indicating that said file sharing option is not enabled between said first user and a user associated with second contact name, and wherein said first attribute differs from said second attribute.

The present invention advantageously provides a simple method and associated system capable of managing networks.

DETAILED DESCRIPTION

Figure 1:
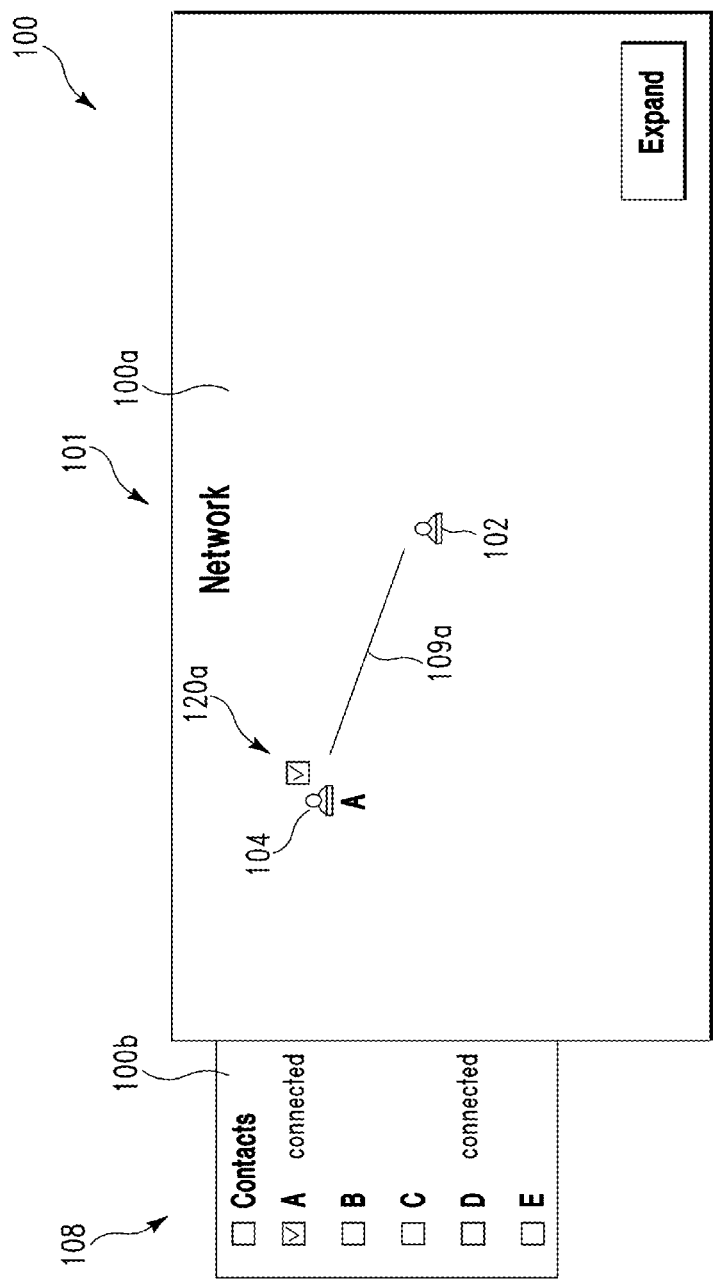
FIG. 1 illustrates a screen shot of a graphical user interface (GUI) dashboard, in accordance with embodiments of the present invention.
Figure 8:
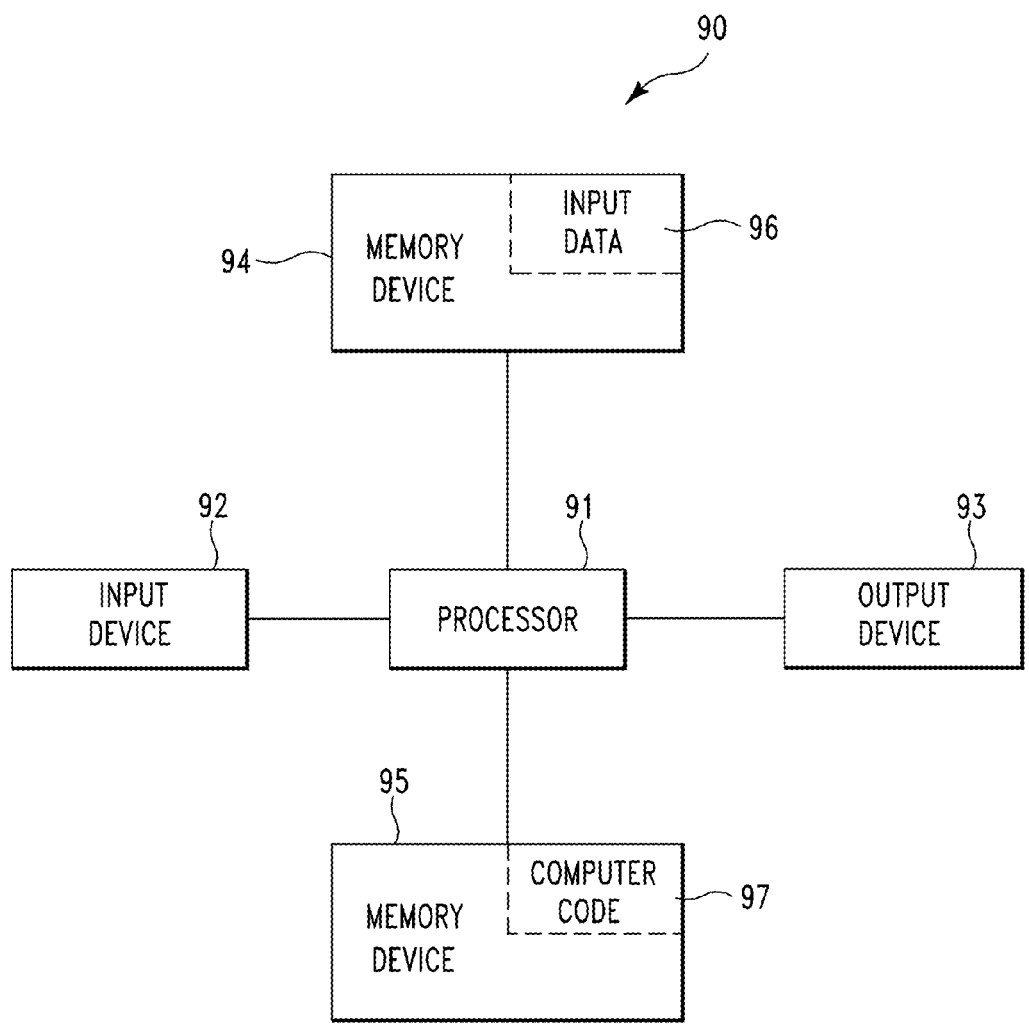
FIG. 8 illustrates a computer apparatus used for managing contacts, in accordance with embodiments of the present invention.

FIG. 1 illustrates a screen shot 100 of a graphical user interface (GUI) dashboard 101, in accordance with embodiments of the present invention. GUI dashboard 101 provides (upon being executed by a computer processor of a computing system as illustrated in FIG. 8) a customizable interface for providing a user with a means for performing functions (e.g., managing contacts, managing online meetings and instant messaging between contacts, managing file sharing between contacts, etc) based on user preferences. GUI dashboard 101 illustrates a map describing a network 120*a* of users. GUI dashboard 101 comprises a portion 100*a* and a portion 100*b*. Portion 100*a* comprises a user icon 102 connected to a contact icon 104 via a link 109*a*. User icon 102 describes a managing user and contact icon 104 describes a contact user associated with the managing user. Portion 100*b* comprises a list of contacts 108 that may be placed within portion 100*a* upon a command (e.g., by placing a checkmark in a box near a selected name as illustrated in FIG. 1 or by dragging the selected name from portion 100*b* to portion 100*a*) from the managing user. When the managing user logs in (i.e., to the computing system enabling GUI dashboard 101), a default GUI dashboard 101 (e.g., comprising only user icon 102) will be presented to the managing user. The managing user may modify the default GUI dashboard 101 by adding additional contact users and performing functions or services associated with the additional contact users.

Figure 2:
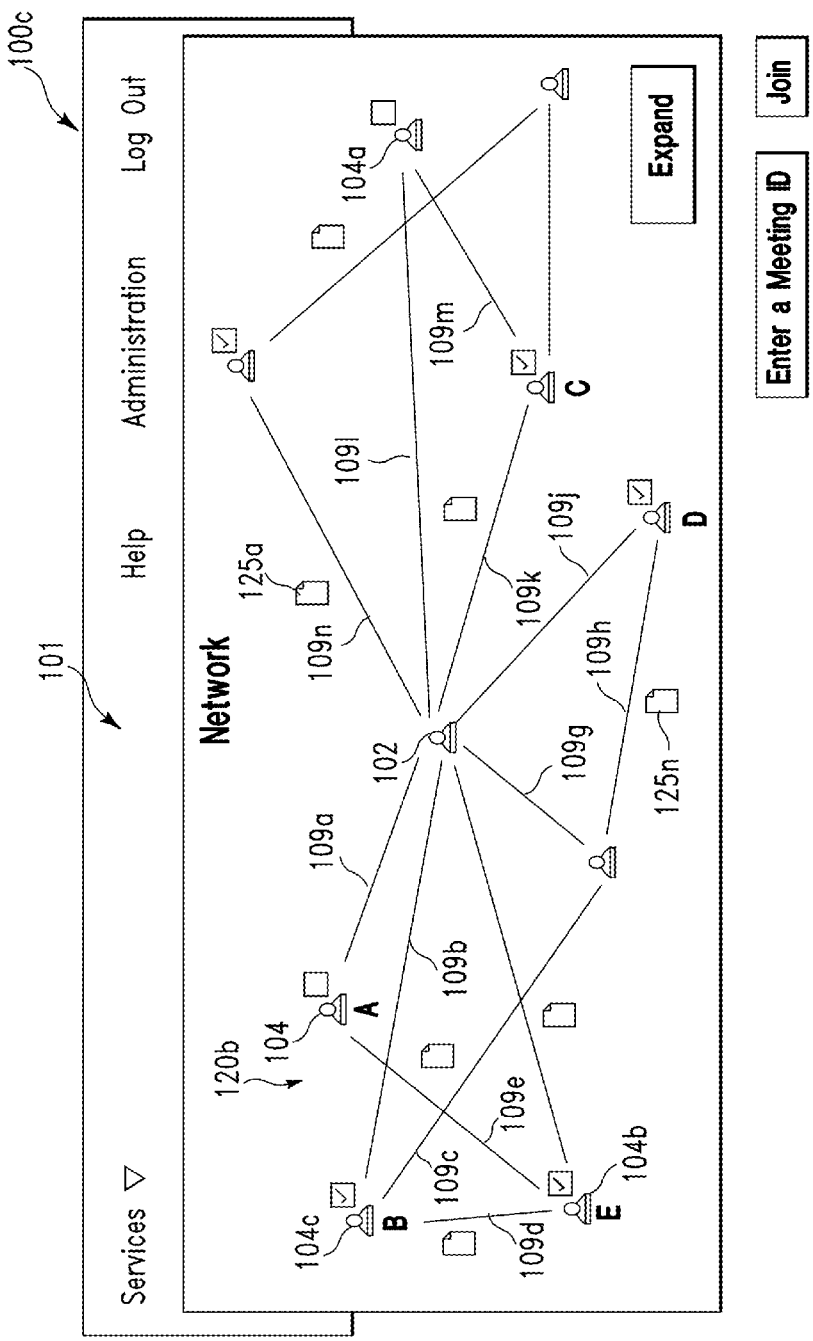
FIG. 2 illustrates a first alternative screen shot, in accordance with embodiments of the present invention.

FIG. 2 illustrates an alternative (to FIG. 1) screen shot 100*c*, in accordance with embodiments of the present invention. In contrast with screen shot 100 of FIG. 1, screen shot 100*c* of FIG. 2 comprises a network 120*b* comprising a plurality of users. Each of the plurality of users is represented by an icon 104*a* . . . 104*n*. Each of icon 104*a* . . . 104*n* are connected to user icon 102 (and to each other) via links 109*a* . . . 109*n*. Each of links 109*a* . . . 109*n* may be presented comprising different attributes (e.g., different colors, fonts, line thicknesses, broken lines, etc) representing different enabled functions between the plurality of users represented by icons 104*a* . . . 104*n*. The different enabled functions may include, inter alia, file sharing options (e.g., for files 125*a* . . . 125*n*), online meeting options, instant messaging options, etc.

Figure 3:
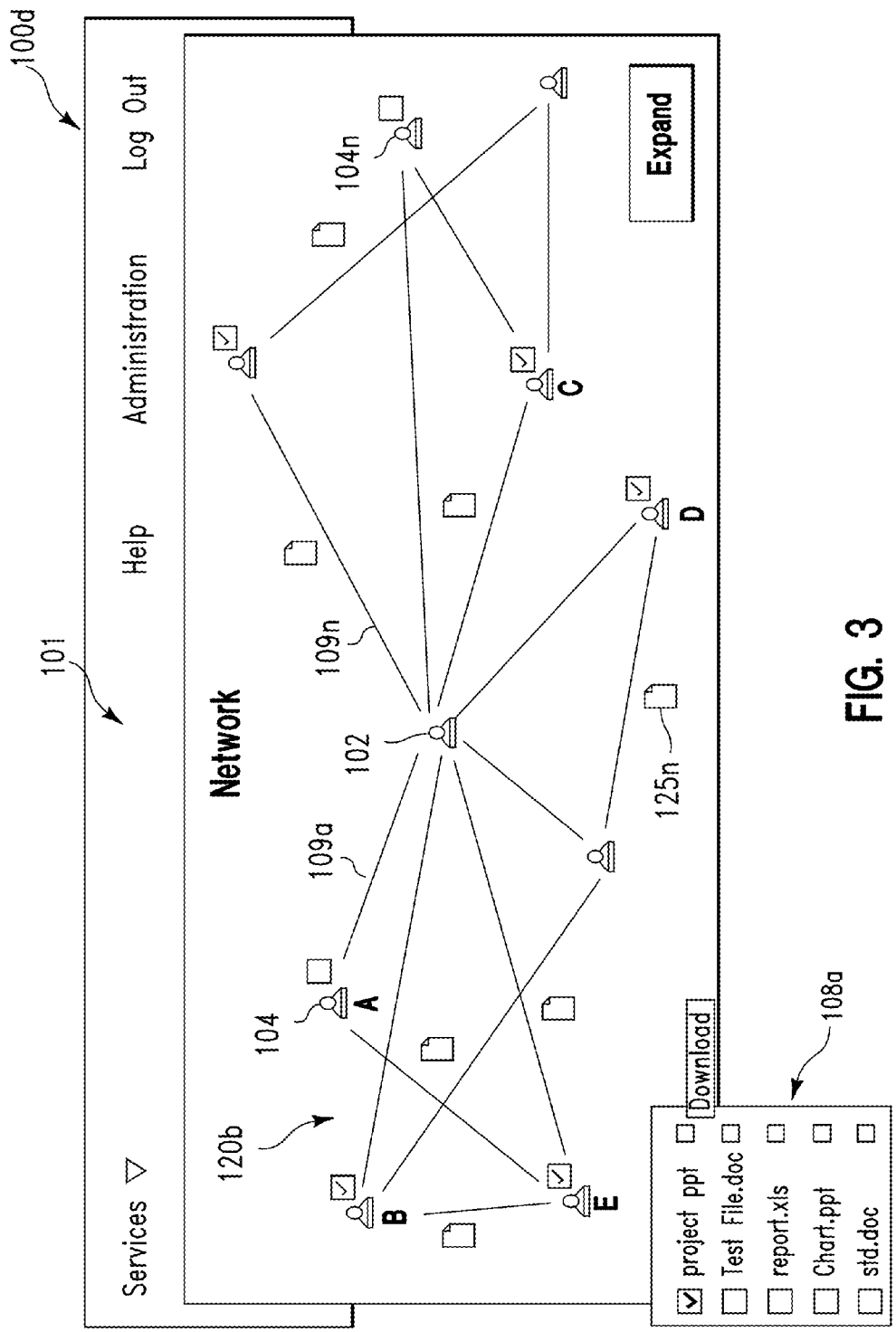
FIG. 3 illustrates a second alternative screen shot, in accordance with embodiments of the present invention.

FIG. 3 illustrates an alternative (to FIG. 2) screen shot 100*d*, in accordance with embodiments of the present invention. In contrast with screen shot 100*c* of FIG. 2, screen shot 100*d* of FIG. 3 comprises a list of files 108*a* (e.g., files 125*a* . . . 125*n* for sharing between the plurality of users) that may be placed at (or associated with) links 109*a* . . . 109*n* (as illustrated in FIG. 3) upon a command (e.g., by placing a checkmark in a box near a selected name as illustrated in FIG. 1 or by dragging the selected name from portion 100*b* to portion 100*a*) from the managing user. Any of files 125*a* . . . 125*n* that have been placed at (or associated with) links 109*a* . . . 109*n* may be downloaded by any selected users.

Figure 4:
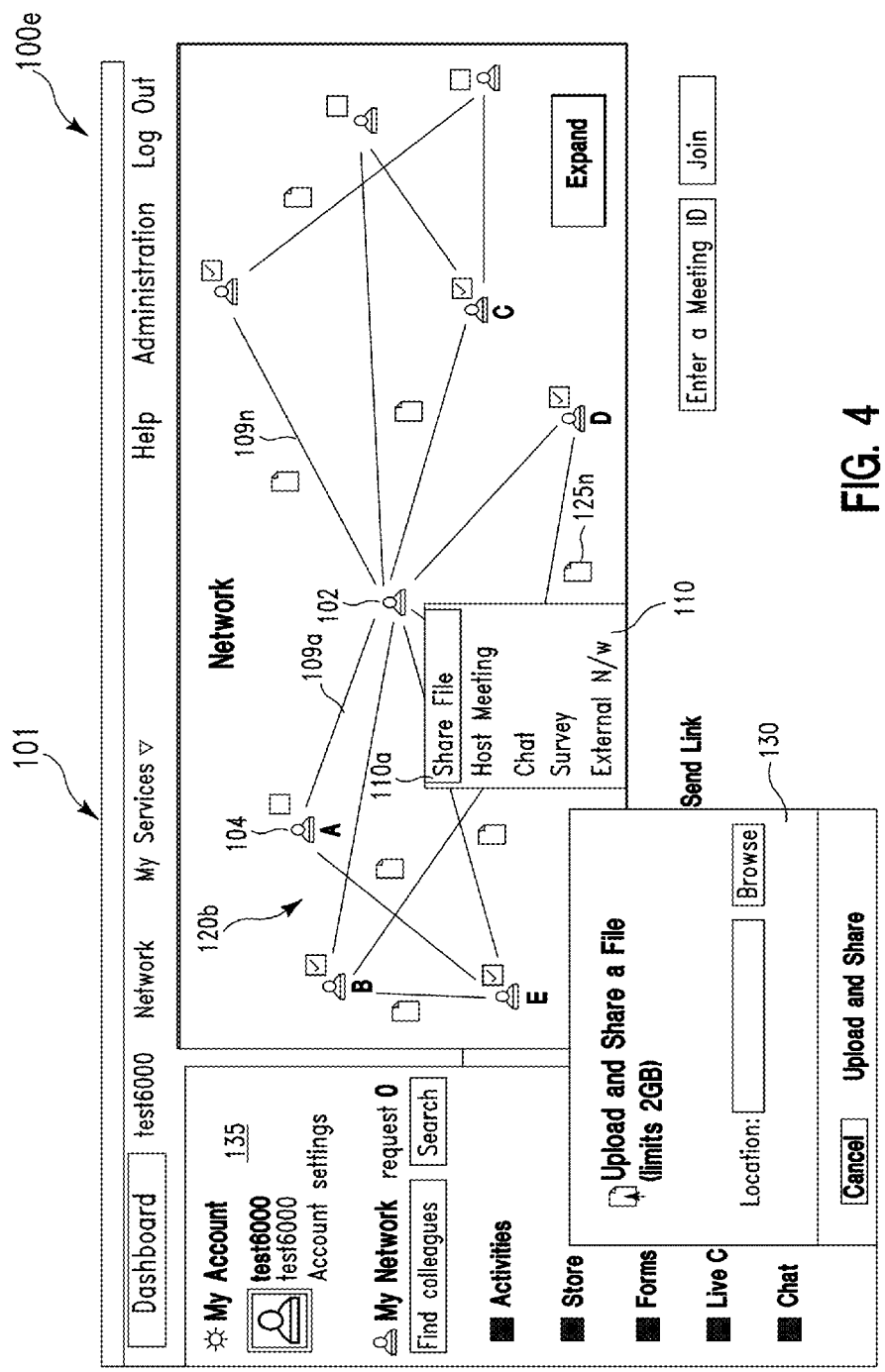
FIG. 4 illustrates a third alternative screen shot, in accordance with embodiments of the present invention.

FIG. 4 illustrates an alternative (to FIG. 3) screen shot 100*e*, in accordance with embodiments of the present invention. In contrast with screen shot 100*d* of FIG. 3, screen shot 100*e* of FIG. 4 comprises function selection menu 110, a file upload menu 130, and an account listing menu 135. Function selection menu 110 comprises a share file function (selected as illustrated by selection box 110*a*), a host meeting function, a chat function, a survey function, and an external network selection function. File upload menu 130 allows the managing user to search for and upload specified files to specific links 109*a* . . . 109*n*.

Figure 5:
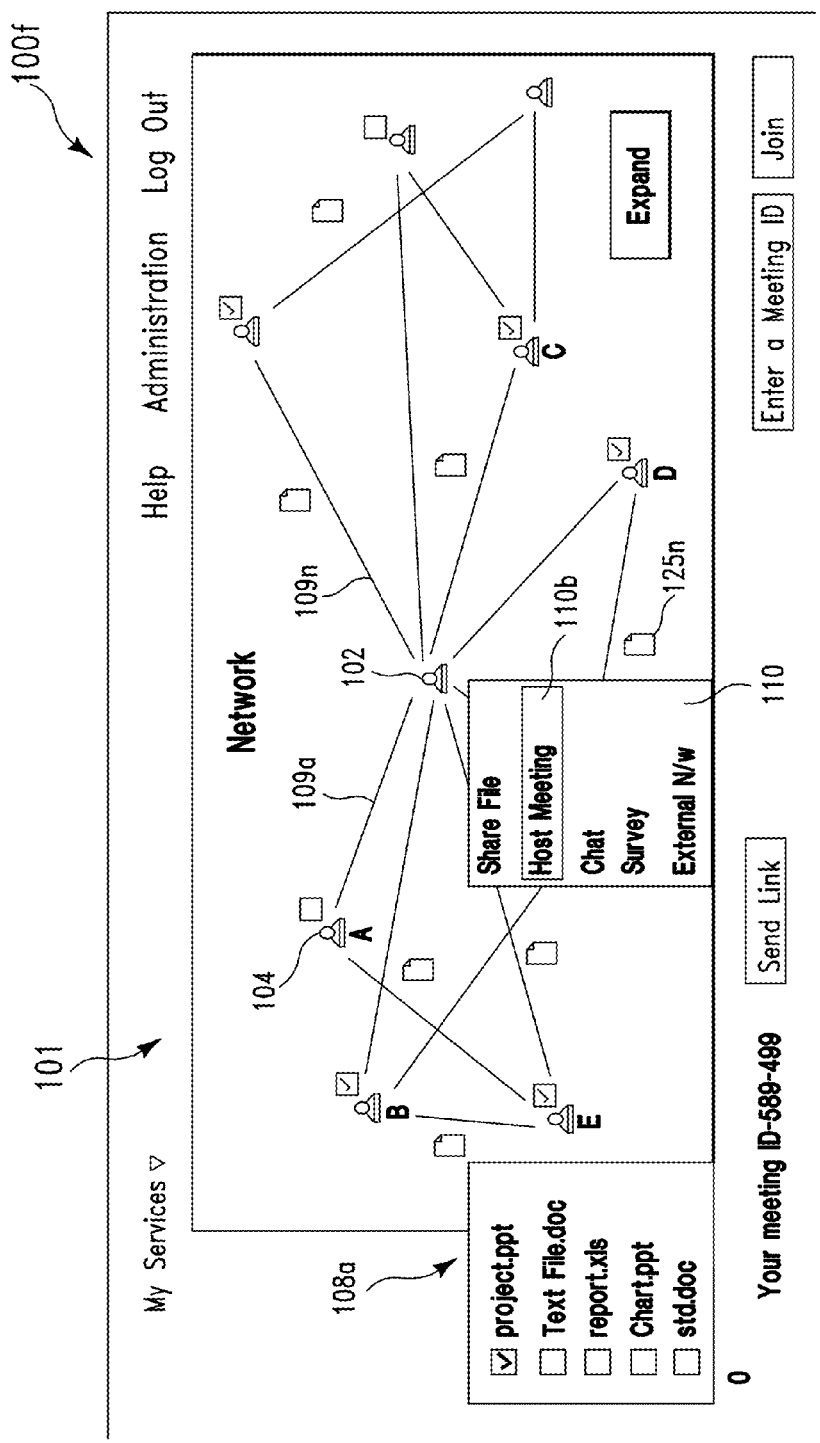
FIG. 5 illustrates a fourth alternative screen shot, in accordance with embodiments of the present invention.

FIG. 5 illustrates an alternative (to FIG. 4) screen shot 100*f*, in accordance with embodiments of the present invention. In contrast with screen shot 100*e* of FIG. 4, screen shot 100*f* of FIG. 5 comprises the host meeting function selected as illustrated by selection box 110*b*.

Figure 6:
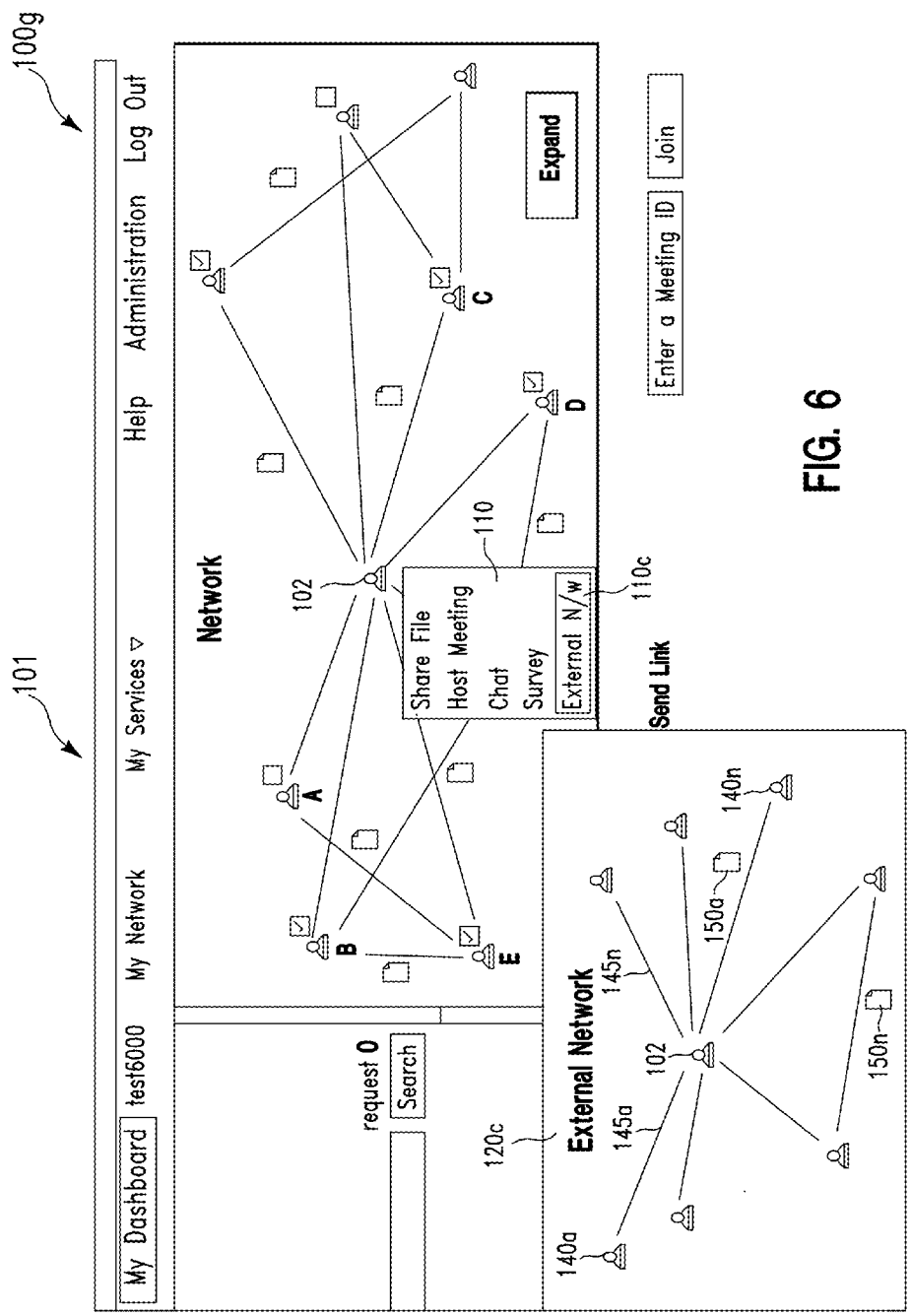
FIG. 6 illustrates a fifth alternative screen shot, in accordance with embodiments of the present invention.

FIG. 6 illustrates an alternative (to FIG. 5) screen shot 100*g*, in accordance with embodiments of the present invention. In contrast with screen shot 100*f* of FIG. 5, screen shot 100*g* of FIG. 6 comprises the external network selection function selected as illustrated by selection box 110*c* thereby enabling a view of an external network 120*c* (i.e., external to network 120*b*) between the managing user and an additional plurality of users. Each of the additional plurality of users is represented by an icon 140*a* . . . 140*n*. Each of icons 140*a* . . . 140*n* are connected to user icon 102 (and to each other) via links 145*a* . . . 145*n*. Each of links 145*a* . . . 145*n* may be presented comprising different attributes (e.g., different colors, fonts, line thicknesses, broken lines, etc) representing different enabled functions between the plurality of users represented by icons 140*a* . . . 140*n*. The different enabled functions may include, inter alia, file sharing options (e.g., for files 150*a* . . . 150*n*), online meeting options, instant messaging options, etc.

Figure 7:
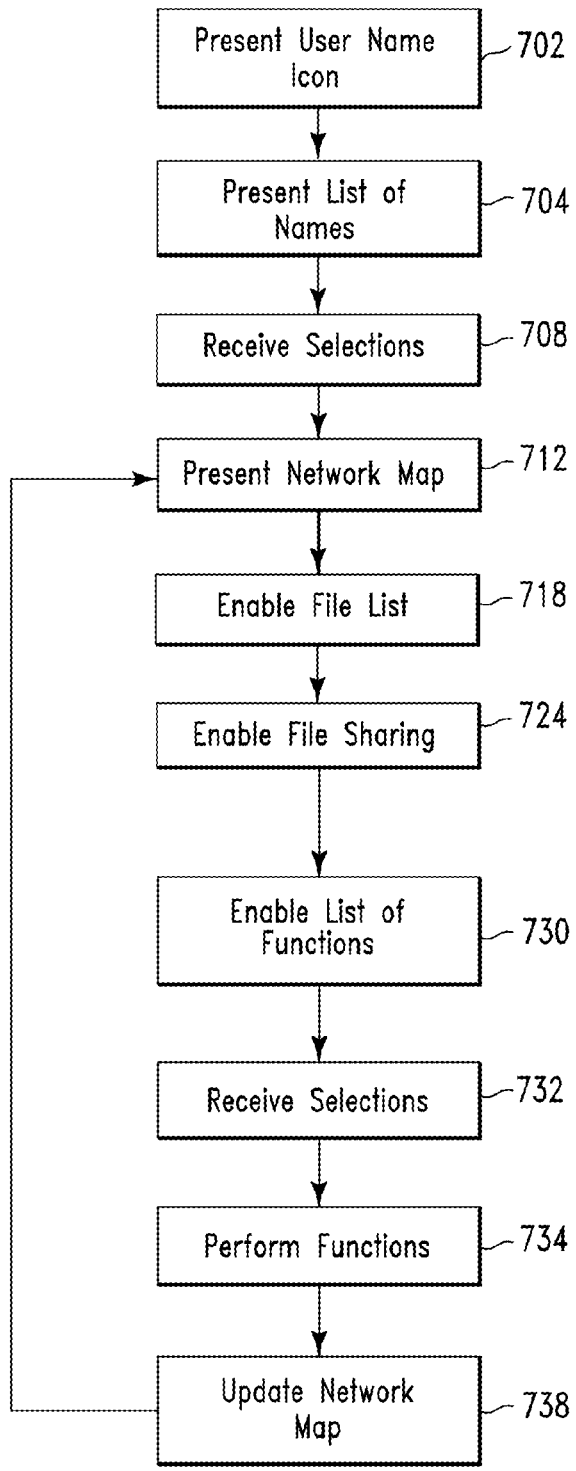
FIG. 7 including illustrates a flowchart describing an algorithm used by the GUI dashboard of FIGS. 1-6 for managing contacts, in accordance with embodiments of the present invention.

FIG. 7 including illustrates a flowchart describing an algorithm used by GUI dashboard 101 of FIGS. 1-6 for managing contacts, in accordance with embodiments of the present invention. In step 702, a computer processor of a computing apparatus (as illustrated in FIG. 8, infra) presents (via a dashboard of a graphical user interface such as GUI 101 of FIGS. 1-6) a user name icon associated with a managing user. In step 704, the computer processor presents (via a contacts panel of the GUI such as portion 100*b* of FIG. 1) a list of names (e.g., list of contacts 108 in FIG. 1) associated with users (or contacts) associated with the managing user. In step 708, the computer processor receives (from the managing user) selections for contact names from the list of names. In step 712, the computer processor generates and presents (via the dashboard of the GUI) an internal network contacts map (e.g., network 120*b* of FIG. 2) that includes the user name icon connected to the selected contact names (selected in step 708) via multiple links (e.g., links 109*a* . . . 109*n* of FIGS. 2-6). Each link may comprise a different attribute indicating different options or functions. For example, a file sharing option between the managing user and one or more contacts may be represented by displaying the associated links in a first color or thickness and a teleconference option between the managing user and other contacts may be represented by displaying the associated links in a second (and different) color or thickness. In step 718, the computer processor enables and presents (to the managing user) a list of files (e.g., list of files 108*a* of FIG. 3). In step 724, the computer processor (in response to selections from the managing user) enables specified files (selected from the list of files) for file sharing between the managing user and selected contacts. For example, the managing user may select a specified file (or group of files) and drag (from the list) the file icon or description to a specified link (on the internal network contacts map) between the managing user and a specified contact thereby enabling file sharing (for the selected file) between the managing user and the specified contact. In this case, a file sharing icon representing the file is presented (within the internal network contacts map) adjacent to the specified link. The file sharing icon indicates the file sharing option. The file sharing icon may be associated with a hidden menu comprising a list of available shared files. A command for displaying the hidden menu may be issued (e.g., by right mouse clicking on the file sharing icon) resulting in the hidden menu (i.e., comprising the list of available shared files) being displayed. Any user associated with this file sharing icon may download any of the files from the list of available shared files. A file upload/download menu 130 (e.g., file upload menu 130) may be used to enable a download of the files. In step 730, the computer processor enables (upon a command from the managing user) a function selection menu (e.g., function selection menu 110 in FIGS. 4-6) comprising a list of selectable functions/options. The function selection menu may include, inter alia, a share file function, a host meeting function, a chat function, a survey function, an external network selection function, etc.

In step 732, the computer processor receives a function selection (from the managing user) from the function selection menu. The function selection is associated with a specified/selected group of users selected from the internal network contacts map. In step 734, the computer processor performs/enables the selected function with respect to the specified/selected group of users. For example, the selected function may include hosting an online meeting (or enabling instant messaging) between the managing user and the specified/selected group of users and may include downloading specified files to each of the specified/selected group of users. Alternatively, the selected function may include enabling an external network of users (i.e., external to the users from the internal network contacts map) and hosting an online meeting (or enabling instant messaging) between the managing user and selected users from the external network of users and optionally the specified/selected group of users from the internal network contacts map. In step 738, the internal network contacts map is updated based on results of steps 724-734 and step 712 is repeated.

FIG. 8 illustrates a computer apparatus 90 (e.g., a computing system used to implement GUI 101 of FIGS. 1-6) used for managing contacts, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 7) used for managing contacts. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may comprise the algorithm of FIG. 7 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to used manage contacts. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for automatically managing virtual machines. In another embodiment, the invention provides a business method that performs the process steps of the invention on a subscription, advertising, and/or fee basis. That is, a service supplier, such as a Solution Integrator, could offer to manage contacts. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

presenting, by a computer processor of a computing apparatus via a dashboard of a graphical user interface, a user name icon associated with a first user;

presenting, by said computer processor via a contacts panel of said graphical user interface, a list of names associated with users associated with said first user;

receiving, by said computer processor from said first user, a first selection for a first contact name of said names;

enabling, by said computer processor in response to an indication from said first user, a file sharing option between said first user and a user associated with said first contact name;

receiving, by said computer processor from said first user, a second selection for a second contact name of said names;

presenting in response to said second selection, by said computer processor via said dashboard, an internal network contacts map comprising said user name icon connected to said first contact name via a first link and said user name icon connected to said second contact name via a second link, wherein said first link comprises a first attribute indicating said file sharing option, wherein said second link comprises a second attribute indicating that said file sharing option is not enabled between said first user and a second user associated with second contact name, and wherein said first attribute differs from said second attribute;

presenting, by said computer processor via said graphical user interface, a function selection menu on a first portion of the dashboard overlapping said internal network contacts map, a file upload menu on a second portion of the dashboard adjacent to said first portion, and an account listing menu on a third portion of said dashboard, wherein said function selection menu comprises a share file function, a host meeting function, a chat function, a survey function, and an external network selection function, wherein said file upload menu presents a file size limit and an upload location specification portion, and wherein said account listing menu presents account settings, activity settings, and a forms settings;

enabling, by said computer processor in response to an indication from said first user, functions of said account settings, said activity settings, and said forms settings between said first user and a user associated with said first contact name;

presenting, by said computer processor via said graphical user interface in response to a selection enabled by said external network selection function, an external network contacts map comprising a duplicate version of said user name icon connected to external contact name icons via additional external links, wherein said external contact name icons are associated with external users associated with said first user, wherein said external users are associated with a network that is external from a network associated with said internal network contacts map, and wherein said external network contacts map is presented in addition and adjacent to internal network contacts map; and enabling, by said computer processor in response to an indication from said first user, file sharing options, online meeting options, and instant messaging options between said first user and said external users.

2. The method of claim 1, further comprising:

presenting, by said computer processor via said dashboard, a file sharing icon adjacent to said first link, wherein said file sharing icon indicates said file sharing option, wherein said file sharing icon is associated with a hidden menu comprising a list of available shared files;

receiving, by said computer processor from said second user via said file sharing icon, a first command for displaying said hidden menu;

presenting, by said computer processor in response to said first command, said list of available shared files;

receiving, by said computer processor from said second user via said list of available shared files, a second command for downloading a first file of said available shared files;

retrieving, by said computer processor in response to said second command, said first file; and transmitting, by said computer processor to said second user, said first file.

3. The method of claim 1, wherein said internal network contacts map additionally comprises said user name icon connected to additional contact names via additional links, wherein said additional contact names are associated with additional users associated with said first user, and wherein said method further comprises:

receiving, by said computer processor, a selection of a group of users of said additional users;

receiving, by said computer processor from said first user via said user name icon, a second command for displaying a hidden command menu associated with a hidden menu comprising a list of available commands; and presenting, by said computer processor in response to said second command, said hidden command menu.

4. The method of claim 3, further comprising:

receiving, by said computer processor from said first user via said hidden command menu, a selection of a command for hosting a meeting; and enabling, by said computer processor in response to said command for hosting said meeting, an online meeting between said first user and said group of users.

5. The method of claim 4, further comprising:

presenting, by said computer processor via said dashboard, file sharing icons adjacent to each of said additional links;

receiving, by said computer processor from said first user via one of said file sharing icons, a first command for displaying a hidden menu;

presenting, by said computer processor in response to said first command, a list of available shared files;

receiving, by said computer processor from said second user via said list of available shared files, a second command for selecting a first file of said available shared files; and retrieving, by said computer processor in response to said second command, said first file; and transmitting, by said computer processor to said group of users, said first file.

6. The method of claim 3, further comprising:

receiving, by said computer processor from said first user via said hidden command menu, a selection of an instant messaging command; and enabling, by said computer processor in response to said instant messaging command, an instant messaging session between said first user and said group of users.

7. The method of claim 3, further comprising:

receiving, by said computer processor, a selection of an additional group of users of said external users;

receiving, by said computer processor from said first user via said hidden command menu, a selection for a command for hosting a meeting; and enabling, by said computer processor in response to said command for hosting said meeting, an online meeting between said first user, said group of users, and said additional group of users.

8. The method of claim 1, wherein said first attribute comprises a first color, wherein said second attribute comprises a second color, and wherein said first color differs from said second color.

9. The method of claim 1, further comprising:

providing a process for supporting computer infrastructure, said process comprising providing at least one support service for at least one of creating, integrating, hosting, maintaining, and deploying computer-readable code in the computing system, wherein the code in combination with the computing system is capable of performing the method of claim 1.

10. A computing system comprising a computer processor coupled to a computer-readable memory unit, said memory unit comprising instructions that when executed by the computer processor implements a method comprising:

presenting, by said computer processor via a dashboard of a graphical user interface, a user name icon associated with a first user;

presenting, by said computer processor via a contacts panel of said graphical user interface, a list of names associated with users associated with said first user;

receiving, by said computer processor from said first user, a first selection for a first contact name of said names;

enabling, by said computer processor in response to an indication from said first user, a file sharing option between said first user and a user associated with said first contact name;

receiving, by said computer processor from said first user, a second selection for a second contact name of said names;

presenting in response to said second selection, by said computer processor via said dashboard, an internal network contacts map comprising said user name icon connected to said first contact name via a first link and said user name icon connected to said second contact name via a second link, wherein said first link comprises a first attribute indicating said file sharing option, wherein said second link comprises a second attribute indicating that said file sharing option is not enabled between said first user and a second user associated with second contact name, and wherein said first attribute differs from said second attributes presenting, by said computer processor via said graphical user interface, a function selection menu on a first portion of the dashboard overlapping said internal network contacts map, a file upload menu on a second portion of the dashboard adjacent to said first portion, and an account listing menu on a third portion of said dashboard, wherein said function selection menu comprises a share file function, a host meeting function, a chat function, a survey function, and an external network selection function, wherein said file upload menu presents a file size limit and an upload location specification portion, and wherein said account listing menu presents account settings, activity settings, and a forms settings;

enabling, by said computer processor in response to an indication from said first user, functions of said account settings, said activity settings, and said forms settings between said first user and a user associated with said first contact name;

presenting, by said computer processor via said graphical user interface in response to a selection enabled by said external network selection function, an external network contacts map comprising a duplicate version of said user name icon connected to external contact name icons via additional external links, wherein said external contact name icons are associated with external users associated with said first user, wherein said external users are associated with a network that is external from a network associated with said internal network contacts map, and wherein said external network contacts map is presented in addition and adjacent to internal network contacts map; and enabling, by said computer processor in response to an indication from said first user, file sharing options, online meeting options, and instant messaging options between said first user and said external users.

11. The computing system of claim 10, wherein said method further comprises:

presenting, by said computer processor via said dashboard, a file sharing icon adjacent to said first link, wherein said file sharing icon indicates said file sharing option, wherein said file sharing icon is associated with a hidden menu comprising a list of available shared files;

receiving, by said computer processor from said second user via said file sharing icon, a first command for displaying said hidden menu;

presenting, by said computer processor in response to said first command, said list of available shared files;

receiving, by said computer processor from said second user via said list of available shared files, a second command for downloading a first file of said available shared files; and retrieving, by said computer processor in response to said second command, said first file; and transmitting, by said computer processor to said second user, said first file.

12. The computing system of claim 10, wherein said internal network contacts map additionally comprises said user name icon connected to additional contact names via additional links, wherein said additional contact names are associated with additional users associated with said first user, and wherein said method further comprises:

receiving, by said computer processor, a selection of a group of users of said additional users;

receiving, by said computer processor from said first user via said user name icon, a second command for displaying a hidden command menu associated with a hidden menu comprising a list of available commands; and presenting, by said computer processor in response to said second command, said hidden command menu.

13. The computing system of claim 12, wherein said method further comprises:

receiving, by said computer processor from said first user via said hidden command menu, a selection of a command for hosting a meeting; and enabling, by said computer processor in response to said command for hosting said meeting, an online meeting between said first user and said group of users.

14. The computing system of claim 13, wherein said method further comprises:

presenting, by said computer processor via said dashboard, file sharing icons adjacent to each of said additional links;

receiving, by said computer processor from said first user via one of said file sharing icons, a first command for displaying a hidden menu;

presenting, by said computer processor in response to said first command, a list of available shared files;

receiving, by said computer processor from said second user via said list of available shared files, a second command for selecting a first file of said available shared files; and retrieving, by said computer processor in response to said second command, said first file; and transmitting, by said computer processor to said group of users, said first file.

15. The computing system of claim 12, wherein said method further comprises:

receiving, by said computer processor from said first user via said hidden command menu, a selection of an instant messaging command; and enabling, by said computer processor in response to said instant messaging command, an instant messaging session between said first user and said group of users.

16. The computing system of claim 12, wherein said method further comprises:

receiving, by said computer processor, a selection of an additional group of users of said external users;

receiving, by said computer processor from said first user via said hidden command menu, a selection for a command for hosting a meeting; and enabling, by said computer processor in response to said command for hosting said meeting, an online meeting between said first user, said group of users, and said additional group of users.

17. The computing system of claim 10, wherein said method further comprises:

wherein said first attribute comprises a first color, wherein said second attribute comprises a second color, and wherein said first color differs from said second color.

18. A computer program product, comprising a computer readable hardware storage device storing a computer readable program code, said computer readable program code comprising an algorithm that when executed by a computer processor of a computing system implements a method comprising:

presenting, by said computer processor via a dashboard of a graphical user interface, a user name icon associated with a first user;

presenting, by said computer processor via a contacts panel of said graphical user interface, a list of names associated with users associated with said first user;
receiving, by said computer processor from said first user, a first selection for a first contact name of said names;
enabling, by said computer processor in response to an indication from said first user, a file sharing option between said first user and a user associated with said first contact name;
receiving, by said computer processor from said first user, a second selection for a second contact name of said names;
presenting in response to said second selection, by said computer processor via said dashboard, an internal network contacts map comprising said user name icon connected to said first contact name via a first link and said user name icon connected to said second contact name via a second link, wherein said first link comprises a first attribute indicating said file sharing option, wherein said second link comprises a second attribute indicating that said file sharing option is not enabled between said first user and a second user associated with second contact name, and wherein said first attribute differs from said second attributes;
presenting, by said computer processor via said graphical user interface, a function selection menu on a first portion of the dashboard overlapping said internal network contacts map, a file upload menu on a second portion of the dashboard adjacent to said first portion, and an account listing menu on a third portion of said dashboard, wherein said function selection menu comprises a share file function, a host meeting function, a chat function, a survey function, and an external network selection function, wherein said file upload menu presents a file size limit and an upload location specification portion, and wherein said account listing menu presents account settings, activity settings, and a forms settings;
enabling, by said computer processor in response to an indication from said first user, functions of said account settings, said activity settings, and said forms settings between said first user and a user associated with said first contact name;
presenting, by said computer processor via said graphical user interface in response to a selection enabled by said external network selection function, an external network contacts map comprising a duplicate version of said user name icon connected to external contact name icons via additional external links, wherein said external contact name icons are associated with external users associated with said first user, wherein said external users are associated with a network that is external from a network associated with said internal network contacts map, and wherein said external network contacts map is presented in addition and adjacent to internal network contacts map; and
enabling, by said computer processor in response to an indication from said first user, file sharing options, online meeting options, and instant messaging options between said first user and said external users.

19. The computer program product of claim 18, wherein said method further comprises:
presenting, by said computer processor via said dashboard, a file sharing icon adjacent to said first link, wherein said file sharing icon indicates said file sharing option, wherein said file sharing icon is associated with a hidden menu comprising a list of available shared files;
receiving, by said computer processor from said second user via said file sharing icon, a first command for displaying said hidden menu;
presenting, by said computer processor in response to said first command, said list of available shared files;
receiving, by said computer processor from said second user via said list of available shared files, a second command for downloading a first file of said available shared files;
retrieving, by said computer processor in response to said second command, said first file; and
transmitting, by said computer processor to said second user, said first file.

20. The computer program product of claim 18, wherein said internal network contacts map additionally comprises said user name icon connected to additional contact names via additional links, wherein said additional contact names are associated with additional users associated with said first user, and wherein said method further comprises:
receiving, by said computer processor, a selection of a group of users of said additional users;
receiving, by said computer processor from said first user via said user name icon, a second command for displaying a hidden command menu associated with a hidden menu comprising a list of available commands; and
presenting, by said computer processor in response to said second command, said hidden command menu.

* * * * *